(12) United States Patent
Gleason et al.

(10) Patent No.: US 7,969,677 B2
(45) Date of Patent: Jun. 28, 2011

(54) WRITE DRIVER MONITORING AND DETECTION

(75) Inventors: Jeffrey A. Gleason, Burnsville, MN (US); Anamul Hoque, Apple Valley, MN (US); David W. Kelly, Eagan, MN (US)

(73) Assignee: LSI Corporation, Milpitas, CA (US)

( * ) Notice: Subject to any disclaimer, the term of this patent is extended or adjusted under 35 U.S.C. 154(b) by 233 days.

(21) Appl. No.: 12/408,847

(22) Filed: Mar. 23, 2009

(65) Prior Publication Data

US 2010/0238575 A1  Sep. 23, 2010

(51) Int. Cl.
*G11B 27/36* (2006.01)
*G11B 5/02* (2006.01)

(52) U.S. Cl. ............................................ 360/31; 360/68
(58) Field of Classification Search .................. None
See application file for complete search history.

(56) References Cited

U.S. PATENT DOCUMENTS

| | | | | |
|---|---|---|---|---|
| 5,729,208 A * | 3/1998 | Ogiwara | ...................... | 340/635 |
| 6,297,921 B1 * | 10/2001 | Price et al. | ...................... | 360/68 |
| 6,353,914 B1 * | 3/2002 | Emerson et al. | .............. | 714/799 |
| 6,952,316 B2 | 10/2005 | Tretter | ............................. | 360/31 |
| 7,206,155 B2 * | 4/2007 | Kuehlwein et al. | ............. | 360/67 |

* cited by examiner

*Primary Examiner* — Daniell L Negrón
*Assistant Examiner* — Regina N Holder
(74) *Attorney, Agent, or Firm* — Ryan, Mason & Lewis, LLP

(57) ABSTRACT

Electronic circuitry and methods are disclosed for monitoring a portion of a write driver, for example, a steady state value of a write driver of a hard disk drive preamplifier. Based on a result of the monitoring, a condition, such as a fault, can be detected in the write driver. For example, apparatus for monitoring a write driver of a disk drive system comprises a comparator circuit coupled to an output of the write driver and configured to compare a value present at the output of the write driver with a reference value such that at least one condition associated with the write driver is detectable as a result of the comparison of the write driver output value and the reference value.

21 Claims, 2 Drawing Sheets

US 7,969,677 B2

WRITE DRIVER MONITORING AND DETECTION

FIELD OF THE INVENTION

The present invention relates generally to electronic circuitry, and more particularly to electronic circuitry for monitoring a portion of a write driver, for example, a steady state value of a write driver of a hard disk drive preamplifier.

BACKGROUND OF THE INVENTION

A hard disk drive is a non-volatile storage device which stores digitally encoded data on one or more rapidly rotating platters with magnetic surfaces, collectively referred to as the disk. It is known that there is no read-back verification that data was properly written to the disk itself. Therefore, a failure in the write driver (also referred to as a writer output circuit), i.e., the circuit that is responsible for controlling the data that is to be written on the disk via by the write head, will go undetected until the user attempts to retrieve data, at which point the data is lost.

A disk drive preamplifier, which is a circuit used to amplify data before it is written to the disk and typically includes a write driver, sometimes includes a circuit to detect an open write head or a write head shorted to ground. However, such a write head open or short detection circuit does not necessarily detect write driver failures.

SUMMARY OF THE INVENTION

The present invention in one or more illustrative embodiments provides electronic circuitry for monitoring a value of a write driver, for example, a steady state value of a write driver of a hard disk drive preamplifier. Based on a result of the monitoring, a condition, such as a fault, can be detected in the write driver.

For example, in accordance with one embodiment, apparatus for monitoring a write driver of a disk drive system comprises a comparator circuit coupled to an output of the write driver and configured to compare a value present at the output of the write driver with a reference value such that at least one condition associated with the write driver is detectable as a result of the comparison of the write driver output value and the reference value.

The apparatus may further comprise a delay circuit for delaying the write driver from turning off until after the comparison of the write driver output value and the reference value is performed.

The write driver may further comprise a driver element (e.g., a class AB driver) that drives a steady state write current and toggles according to a polarity associated with data to be written to a disk of the disk drive system. The driver element has input terminals through which data to be written to a disk of the disk drive system is presented, and output terminals which represent the output of the write driver that is coupled to the comparator circuit. In one case, the condition to be detected is a proper bias voltage at the output terminals of the class AB driver. However, the apparatus may comprise various other configurations for detecting one or more other conditions associated with the write driver.

These and other objects, features, and advantages of the present invention will become apparent from the following detailed description of illustrative embodiments thereof, which is to be read in connection with the accompanying drawings.

DETAILED DESCRIPTION OF THE INVENTION

Embodiments of the invention will be illustrated herein in conjunction with an exemplary write driver of a hard disk drive system. It should be understood, however, that the monitoring and detection principles of the present invention can be implemented using other types of circuitry and systems than that specifically shown and described in conjunction with the illustrative embodiments.

In one embodiment, a circuit is provided that monitors the voltage level at a write driver (also referred to as a writer output circuit) of a hard disk drive preamplifier to detect a writer output circuit failure. Such a circuit failure, if not detected, could result in lost user data. One writer output stage includes a class AB driver that provides the steady state write current through series impedance matching resistors and H-bridge configured current sources to provide overshoot current at transitions. An embodiment illustratively described herein monitors the voltage at the AB driver output to detect an incorrect bias condition so as to warn a user of a possible circuit failure. It has been realized that sometimes a selected write driver may become unintentionally de-selected. With existing write driver circuits, such a fault would go undetected and thus unreported. However, in accordance with monitoring and detection techniques of the invention, such a failure is advantageously detected and can thus be reported.

In accordance with embodiments of the invention, one can check for the proper bias voltage at the output of the AB driver. It is possible to monitor this voltage and compare it to an independently generated reference voltage. A fault can be declared when the AB driver voltage is higher or lower than the target set by the reference. This comparison of the AB driver to the reference is made just before turning the write driver off at the end of a write sector. When the write driver is commanded to turn off, the data will be momentarily (e.g., about 10 nanoseconds) held in one state while the comparison is made, then the write driver turns off.

It is to be understood that the following circuit description is given below without reference to the specific terminals (e.g., input and output), gates, sources, drains, etc. by which a given component is coupled to one or more other components. Given the circuit diagram of FIG. 1, the functional description of each component below, and their interaction with one another also described in detail below, one of ordinary skill in the art would realize how each component is to be coupled in order to implement the circuitry of the various embodiments of the invention. Of course, it is also to be understood that the coupling of components could be accomplished in a variety of alternative straightforward ways, each of which could achieve various advantages of the invention.

Figure 1:
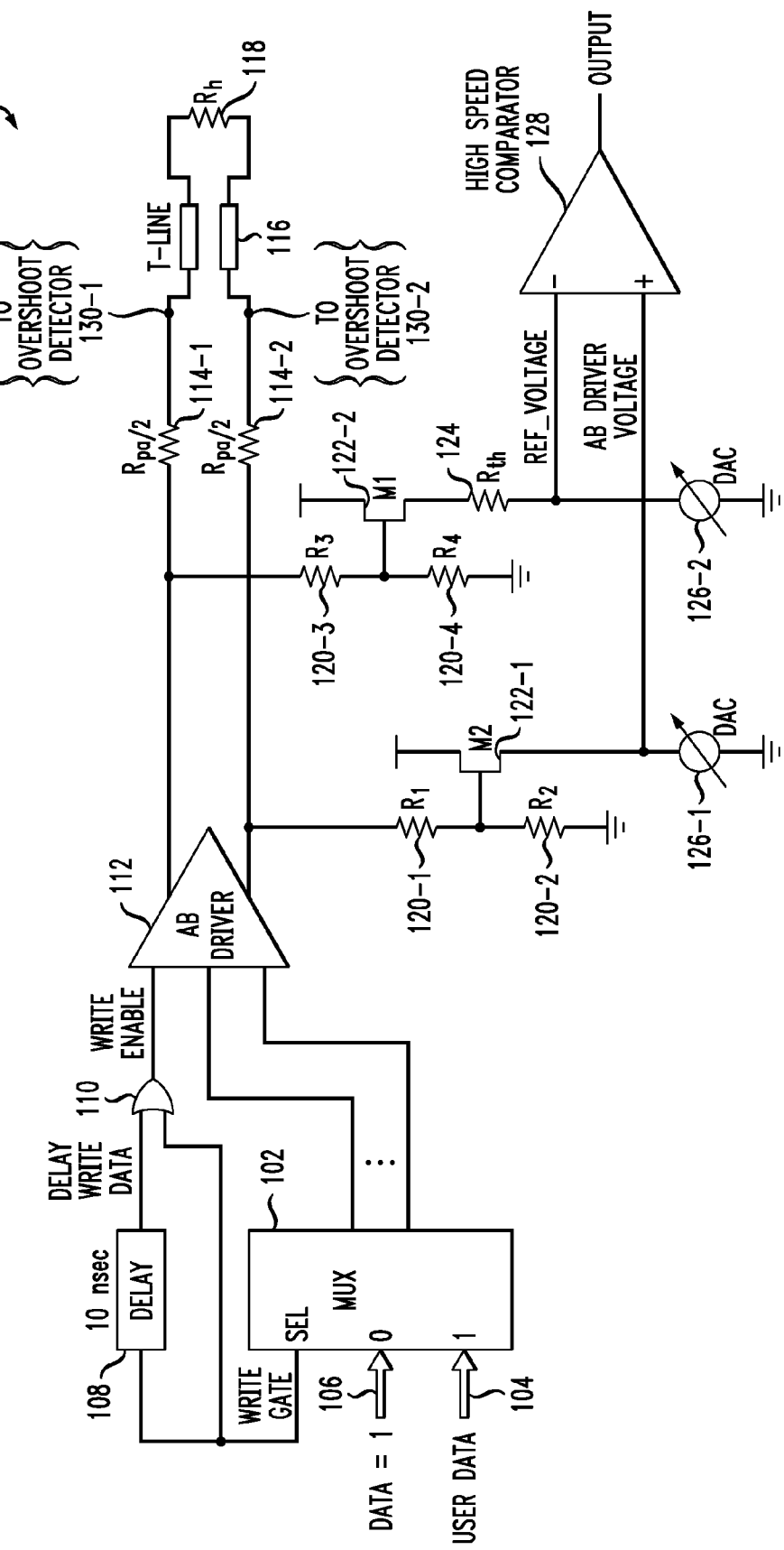
FIG. 1 illustrates a writer output circuit (write driver) that implements monitoring and detection circuitry according to one embodiment of the invention.

FIG. 1 illustrates a writer output circuit (write driver) 100 that implements monitoring and detection circuitry according to one embodiment of the invention, along with the environment in which the writer output circuit may operate. It is to be understood that FIG. 1 illustrates components of the writer output circuit needed to facilitate an understanding of an operation of monitoring and detection circuitry according to an embodiment of the invention. Thus, other components may be present in the writer output circuit that are not explicitly shown. In any case, as mentioned above, the writer output circuit components shown in FIG. 1 are intended to be only one example of circuit components with which monitoring and detection techniques of the invention may be employed.

Furthermore, the circuit 100 may be implemented in a preamplifier circuit of a disk drive system which, in one case, can be realized as a preamplifier integrated circuit. However, it is to be understood that, in an alternative embodiment, the monitoring and detection circuit components (e.g., comparator, delay circuit elements, etc.) shown in FIG. 1 and described below may be implemented in a circuit (or integrated circuit) separate from the write driver and preamplifier circuit (or integrated circuit).

As shown in FIG. 1, writer output circuit (write driver) 100 includes a data multiplexer (mux) 102, controlled by a write gate signal (assumed to be provided to circuit 100), that selects differential user data 104 during normal write operations or selects data=1 (logic high) 106 for a fault detection time. Circuit 100 also includes a delay circuit that includes a delay element 108 and OR gate 110 that delays writer turn-off long enough to allow the writer output and fault circuitry to settle (usually about 10 nanoseconds), but provides minimal gate delays for write driver turn-on. Circuit 100 also includes a fully differential class AB driver 112 that drives the steady state write current and toggles according to the write data polarity.

Further, as shown, circuit 100 includes series termination resistors (Rpa/2) 114-1 and 114-2 that match the transmission line that connects the preamplifier (of which circuit 100 is preferably a part of) and the write head of the hard disk drive. A resistor 118 (Rh) is shown to represent the resistance of the write head (not explicitly shown).

Writer output circuit 100 is shown to also include a resistor divider network 120-1 (R1), 120-2 (R2), 120-3 (R3) and 120-4 (R4) that divides the AB driver 112 output voltage, and a pair of transistors 122-1 and 122-2 (M1 and M2) operating as source followers that buffer the divided AB driver output voltage. Also shown in circuit 100 is a resistor 124 (Rth) through which a reference current flows to generate a reference voltage smaller than the target AB driver voltage.

Still further, circuit 100 includes two matched DAC (digital-to-analog) current sources 126-1 and 126-2 that provide the reference current proportional to the target AB driver 112 voltage (proportional to the programmed target steady state write current). Lastly, circuit 100 includes a high speed comparator 128 that indicates whether the AB driver voltage is greater than the target AB driver voltage (i.e., greater than the reference voltage).

Thus, it is to be appreciated that while writer output circuit 100 includes both a write driver and monitoring/detection circuitry, the write driver portion of this particular embodiment includes the multiplexer 102, the AB driver 112 and the series termination resistors 114-1 and 114-2, and the monitoring and detection circuitry portion of this particular embodiment includes the delay circuit components (delay element 108 and OR gate 110) and the comparator circuit components (resistor divider network 120-1, 120-2, 120-3 and 120-4, transistors 122-1 and 122-2, resistor 124, matched DAC current sources 126-1 and 126-2, and high speed comparator 128).

During normal write operations, the AB driver 112 toggles with user data 104 at an output voltage (positive and negative, depending on the data state) equal to Iss*(Rpa+Rh), where Iss is the user programmed steady state write current. The reference DAC (126-2) that generates the reference voltage for this circuit tracks the DAC 126-1 (note that user programmability is not explicitly shown but understood to be straightforward in implementation) used to set the steady state write current. The reference voltage (the reference DAC current times Rth) is scaled to be smaller than the target AB driver voltage to allow a margin for offsets and other small system variations. Note that, in this particular embodiment, the reference voltage is provided to the negative input of comparator 128 and the AB driver voltage is provided to the positive input of the comparator.

At write driver turn-off, the following occurs:
the write gate signal goes to a logic low state;
the multiplexer 102 selection forces the AB driver 112 to a logic high state;
a 10 nanosecond delay allows the signals through the multiplexer 102, the AB driver 112, the source followers 122-1 and 122-2, the reference voltage and the comparator 128 to settle to a state indicating that the write driver is functioning properly or not; and
at the end of the 10 nanosecond delay, the state of the comparator 128 is digitally sampled and the write driver turned off.

If the voltage from the voltage output of the AB driver is greater than or equal to the reference voltage, then no fault is detected. However, if the voltage output of the AB driver is less than the reference voltage, then a fault is detected, i.e., improper bias voltage fault condition (in this case, lower than expected). The output of the comparator 128 can be sent to a processor or some other circuit of the disk drive system so that this fault can be reported to a user or maintenance system.

By way of example only, in one embodiment, the reference voltage (negative input of comparator 128) may be: REF_VOLT=3.675 k(Rth)*168 uA=617 mV for Iss=40 mA; and the AB driver voltage (positive input of comparator 128) may be: AB DRIVER_VOLTAGE=40 mA(Iss)*(Rpa+Rh)*R2/(R1+R2)=690 mV for R1=3*R2, where uA is microAmps, mA is milliamps, and mV is milliVolts. The reference current may be 168 uA for Iss=40 mA. Still further, the voltage equal to the reference DAC current times Rth, which is scaled to be smaller than the target AB driver voltage, may be: 2LSB*(Rpa+Rh)/(R2/(R1+R2)), LSB=3.3 mA, Rpa=66 Ohms, Rh=3 Ohms. It is to be understood that all of the above values are intended to be approximate values and for example purposes only, i.e., principles of the invention are not intended to be limited to these particular values.

In an alternative embodiment that can be implemented in a straightforward manner given the above descriptions, the reference voltage could be increased to indicate if the AB driver voltage is higher than expected. This would cover an additional class of failure modes associated with the write driver.

In yet another alternative embodiment that can be implemented in a straightforward manner given the above descriptions, an additional detection phase could be added by adding an offset current to DAC current sources 126-1 and 126-2 (by simply changing value of DACs). Then, either polarity of the user data 104 can be selected by digitally controlling the user data 104. In this way, proper AB driver operation can be detected in both polarities.

Still further, an additional phase and set of detectors could be implemented to detect proper operation of overshoot drivers (not shown here), where the overshoot drivers are turned on and held on while the write driver output voltage is sampled at the other side of Rpa/2 (114-1 and 114-2), i.e., at the output, but limited to higher overshoot current because of Iovershoot*Rh is small. This can be accomplished in a straightforward manner by providing a set of overshoot detectors that sense this condition at the output, i.e., at points 130-1 and 130-2 shown in FIG. 1.

It is possible to detect the write driver output voltage directly at the write driver circuit pins (differential input voltage at t-line 116) and thereby include failure of the matching resistors as a detectable failure mode, but since the write head resistance is only three Ohms, the signal at that point is very small. A fault detection circuit capable of detecting such a small signal (without false failures) would add capacitance to the head pins and degrade the write data signal fidelity during normal operation. Write head open fault detection circuitry in accordance with the invention looks for a broken head, which results in a much larger voltage, and so can be less sensitive and has little impact on write driver performance. This fault detection would not cover failure of Rpa (114-1 and 114-2). To cover such a failure, the circuit senses voltage (Iss*Rh) at the other side of Rpa (at points 130-1 and 130-2).

Figure 2:
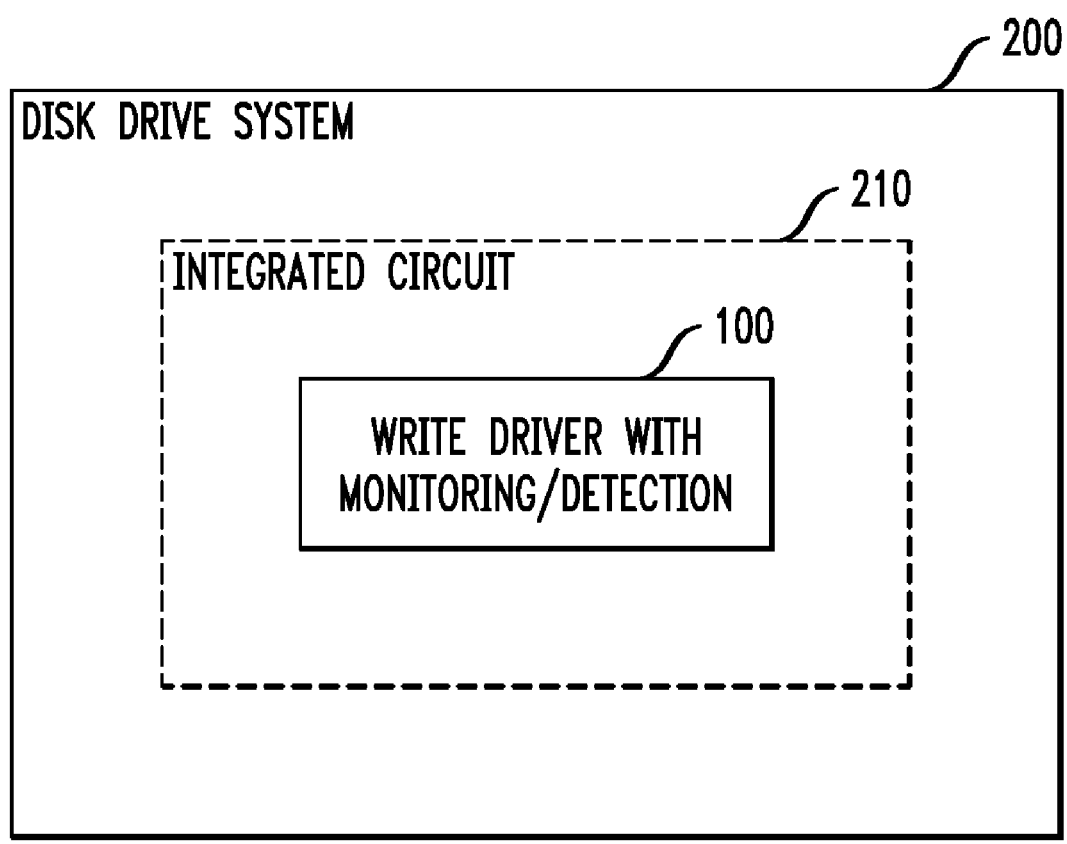
FIG. 2 illustrates an integrated circuit of a disk drive system for implementing write driver and monitoring/detection circuitry according to one embodiment of the invention.

FIG. 2 shows a disk drive system 200 including an integrated circuit 210 that incorporates write driver and monitoring/detection circuitry 100 described in conjunction with FIG. 1. Integrated circuit 210 shown in FIG. 2 may be part of a larger integrated circuit device, such as a microprocessor, central processing unit (CPU), digital signal processor (DSP), application-specific integrated circuit (ASIC), or other type of processor or integrated circuit device. Further, such integrated circuit 210 may be part of a preamplifier integrated circuit that is mounted near a write head (not shown) of the disk drive system 200. In another embodiment, integrated circuit 210 could be two or more separate integrated circuits, one or more with the write driver components of FIG. 1, and the other one or more with the monitoring/detection components of FIG. 1.

In an integrated circuit implementation of the invention, multiple integrated circuit dies are typically formed in a repeated pattern on a surface of a wafer. Each such die may include a device comprising write driver and monitoring/detection circuitry as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Again, it should be emphasized that the above-described embodiments of the invention are intended to be illustrative only. For example, other embodiments can use different types and arrangements of circuitry, control logic elements, processing elements and other circuit elements for implementing the described functionality. These and numerous other alternative embodiments within the scope of the following claims will be apparent to those skilled in the art.

What is claimed is:

1. Apparatus for monitoring a write driver of a disk drive system, the apparatus comprising:
   a comparator circuit coupled to the write driver and configured to compare a value present at a first output of the write driver with a reference value derived from a value present at a second output of the write driver such that at least one condition associated with the write driver is detectable as a result of the comparison of the write driver output value and the reference value.

2. The apparatus of claim 1, wherein the comparator circuit further comprises at least one comparator and a reference value generating source, the comparator having a first input, a second input and an output, wherein the first comparator input is coupled to the write driver first output and the second comparator input is coupled to the reference value generating source, and further wherein the comparator output yields a value indicative of whether the detectable condition exists.

3. The apparatus of claim 2, wherein the comparator circuit further comprises a resistor divider network that divides voltages present at the write driver first and second outputs.

4. The apparatus of claim 3, wherein the comparator circuit further comprises a pair of transistors, respectively coupled to parts of the resistor network, that buffer the divided write driver first and second output voltages.

5. The apparatus of claim 4, wherein the comparator circuit further comprises a resistor, coupled to a first one of the pair of transistors, through which a reference current flows to generate a reference voltage, further wherein the reference voltage corresponds to the reference value.

6. The apparatus of claim 5, wherein the comparator circuit further comprises a matched pair of current sources, respectively coupled to a second one of the pair of transistors and the resistor, that provide the reference current proportional to a target voltage for the write driver first output, further wherein the target voltage corresponds to the reference voltage.

7. The apparatus of claim 5, wherein the reference voltage is set to be less than the voltage present at the write driver first output.

8. The apparatus of claim 5, wherein the reference voltage is set to be not less than the voltage present at the write driver first output.

9. The apparatus of claim 1, further comprising a delay circuit for delaying the write driver from turning off until after the comparison of the write driver first output value and the reference value is performed.

10. The apparatus of claim 1, wherein the write driver further comprises a driver element that drives a steady state write current and toggles according to a polarity associated with data to be written to a disk of the disk drive system.

11. The apparatus of claim 10, wherein the condition to be detected is an improper bias voltage at the output terminals of the driver.

12. The apparatus of claim 11, wherein the bias voltage is a function of a steady state current output by the driver element.

13. The apparatus of claim 1, further comprising a set of detectors respectively coupled to the first and second outputs of the write driver and configured to detect at least another condition associated with the write driver.

14. The apparatus of claim 1, wherein at least one of the write driver and the comparator circuit are implemented in an integrated circuit.

15. An integrated circuit comprising the write driver and the comparator circuit of claim 1.

16. A method, comprising the steps of:
   generating a reference value; and
   comparing the reference value to a value present at a first output of a write driver of a disk drive system such that at least one condition associated with the write driver is detectable as a result of the comparison of the write driver output value present at the first output of the write driver and the reference value; and
   wherein the reference value is derived from a value present at a second output of the write driver.

17. The method of claim 16, wherein the condition to be detected is an improper bias voltage at the first output of the write driver.

18. The method of claim 17, wherein the bias voltage is a function of a steady state current output by the write driver.

19. The method of claim 16, wherein the write driver comprises a driver element that generates the write driver output value to be compared to the reference value.

20. The method of claim 19, wherein, at a write driver turn-off time, the driver element is driven to a given logic state, a delay is introduced to allow the comparing step to be performed by a comparator, an output of the comparator is sampled, and the write driver is turned off.

21. A disk drive system, comprising:
a write driver configured to control a write head that writes data to at least one disk; and
a comparator circuit coupled to the write driver and configured to compare a value present at a first output of the write driver with a reference value derived from a value present at a second output of the write driver such that at least one condition associated with the write driver is detectable as a result of the comparison of the write driver output value present at the first output of the write driver and the reference value.

* * * * *